US009178426B2

(12) United States Patent
Hasegawa

(10) Patent No.: US 9,178,426 B2
(45) Date of Patent: Nov. 3, 2015

(54) THREE-PHASE ALTERNATING-CURRENT POWER SUPPLY SWITCHING CIRCUIT

(71) Applicant: MITSUBISHI ELECTRIC CORPORATION, Tokyo (JP)

(72) Inventor: Koji Hasegawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/597,473

(22) Filed: Jan. 15, 2015

(65) Prior Publication Data

US 2015/0236591 A1 Aug. 20, 2015

(30) Foreign Application Priority Data

Feb. 18, 2014 (JP) .................................. 2014-028265

(51) Int. Cl.
*H02M 3/158* (2006.01)
(52) U.S. Cl.
CPC ...................... *H02M 3/158* (2013.01)
(58) Field of Classification Search
CPC ...................................................... H02M 3/158
See application file for complete search history.

(56) References Cited

U.S. PATENT DOCUMENTS

| 6,313,636 | B1* | 11/2001 | Pohl et al. ...................... 324/421 |
| 2001/0055186 | A1* | 12/2001 | Wodrich et al. ............... 361/111 |
| 2008/0265828 | A1* | 10/2008 | Ganev et al. ................... 318/777 |
| 2009/0161270 | A1* | 6/2009 | Beatty et al. .................... 361/42 |
| 2011/0050154 | A1* | 3/2011 | Farr .............................. 318/778 |
| 2014/0175882 | A1* | 6/2014 | Casteel .......................... 307/31 |

FOREIGN PATENT DOCUMENTS

| EP | 2421143 A2 | 2/2012 |
| GB | 362893 A | 12/1931 |
| JP | 2006-197687 A | 7/2006 |
| JP | 3900444 B2 | 4/2007 |

* cited by examiner

*Primary Examiner* — Emily P Pham
(74) *Attorney, Agent, or Firm* — Birch, Stewart, Kolasch & Birch, LLP

(57) ABSTRACT

An operation circuit is set to a conductive state in a case where a three-phase alternating-current power supply switching circuit receives an R phase and an N phase. An internal switch is set to a non-conductive state in a case where the state of the operation circuit is the conductive state. One contactor electrically connects an input terminal to output terminals in a case where the state of the operation circuit is the conductive state. Another contactor electrically disconnects input terminals from the output terminals in a case where the state of the internal switch is the non-conductive state.

3 Claims, 3 Drawing Sheets

| NEUTRAL WIRE | OPERATION CIRCUIT B | CONTACTOR A | CONTACTOR B |
|---|---|---|---|
| PRESENCE (THREE-PHASE FOUR-WIRE) | ON | OPEN | CLOSE (N OUTPUT) |
| ABSENCE (THREE-PHASE THREE-WIRE) | OFF | CLOSE | OPEN |

| NEUTRAL WIRE | OPERATION CIRCUIT B | P-P VOLTAGE | SW1 | CONTACTOR A | CONTACTOR B |
|---|---|---|---|---|---|
| PRESENCE (THREE-PHASE FOUR-WIRE) | ON | OVERVOLTAGE | OFF | OPEN | CLOSE (N OUTPUT) |
| | | RATED VOLTAGE | ON | | |
| | | LOW VOLTAGE | OFF | | |
| ABSENCE (THREE-PHASE THREE-WIRE) | OFF | OVERVOLTAGE | OFF | OPEN | OPEN |
| | | RATED VOLTAGE | ON | CLOSE | |
| | | LOW VOLTAGE | OFF | OPEN | |

THREE-PHASE ALTERNATING-CURRENT POWER SUPPLY SWITCHING CIRCUIT

BACKGROUND OF THE INVENTION

1. Field of the Invention

The present invention relates to a three-phase alternating-current power supply switching circuit compatible with a plurality of kinds of three-phase alternating-current power supplies.

2. Description of the Background Art

A three-phase alternating-current power supply is used for various technologies. Japanese Patent No. 3900444 discloses a technology as an example in which the three-phase alternating-current power supply is used (hereinafter referred to as a related technology A). Three power conversion parts are used in the related technology A. Moreover, the related technology A controls switching such that the three-phase alternating-current power supply is connected to each power conversion part in a star connection upon a high input voltage and in a delta connection upon a low input voltage. This ensures that each element of a downstream circuit is resistant to a wide range of the input voltages.

Furthermore, a thyristor is used as a switching means that controls switching in the related technology A. The related technology A switches a state of the switching means on the basis of a phase-to-phase voltage (200 V or 400 V) of the three-phase alternating-current power supply.

The three-phase alternating-current power supply includes a plurality of kinds of systems, such as a three-phase three-wire system and a three-phase four-wire system. Thus, a three-phase alternating-current power supply switching circuit compatible with the plurality of kinds of three-phase alternating-current power supplies is required.

In the related technology A, the switching means is used to be compatible with the plurality of kinds of three-phase alternating-current power supplies. However, the thyristor is used as the switching means in the related technology A. Consequently, the related technology A requires a drive circuit for switching the thyristor, a timing control circuit, and a circuit for determining whether or not to control the switching. Therefore, the related technology A has the complex configuration compatible with the plurality of kinds of three-phase alternating-current power supplies.

SUMMARY OF THE INVENTION

It is an object of the present invention to provide a three-phase alternating-current power supply switching circuit that restrains a configuration compatible with a plurality of kinds of three-phase alternating-circuit power supplies from being complex.

A three-phase alternating-current power supply switching circuit connected to three first input terminals for respectively receiving a first phase, a second phase, and a third phase that form a three-phase alternating current and connected to a second input terminal for receiving a fourth phase being an N phase. The three-phase alternating-current power supply switching circuit includes three output terminals that respectively correspond to the three first input terminals; a first operation circuit that is set to any of a first conductive state and a first non-conductive state; a first contactor that is controlled by the first operation circuit; a second operation circuit that is set to any of a second conductive state and a second non-conductive state; and a second contactor that is controlled by the second operation circuit. The operation circuit is set to: (a1) the second conductive state in a case where the three-phase alternating-current power supply switching circuit receives the first phase and the fourth phase, and (a2) the second non-conductive state in a case where the three-phase alternating-current power supply switching circuit does not receive at least one of the first phase and the fourth phase. The second contactor includes an internal switch. The internal switch is set to: (a3) a third conductive state in a case where a state of the second operation circuit is the second non-conductive state, and (a4) a third non-conductive state in a case where the state of the second operation circuit is the second conductive state. The second contactor: (a5) electrically disconnects the second input terminal from the three output terminals in a case where the state of the second operation circuit is the second non-conductive state, and (a6) electrically connects the second input terminal to the three output terminals in a case where the state of the second operation circuit is the second conductive state. The first operation circuit is set to: (a7) the first conductive state in a case where the three-phase alternating-current power supply switching circuit receives the second phase and a state of the internal switch is the third conductive state, and (a8) the first non-conductive state in a case where the state of the internal switch is the third non-conductive state. The first contactor: (a9) electrically disconnects the three first input terminals from the three output terminals in a case where a state of the first operation circuit is the first non-conductive state, and (a10) electrically and respectively connects the three first input terminals to the three output terminals in a case where the state of the first operation circuit is the first conductive state.

In the present invention, the second operation circuit is set to the second conductive state in a case where the three-phase alternating-current power supply switching circuit receives the first phase and the fourth phase. The internal switch is set to the third non-conductive state in a case where the state of the second operation circuit is the second conductive state. The second contactor electrically connects the second input terminal to the three output terminals in a case where the state of the second operation circuit is the second conductive state. The first contactor electrically disconnects the three first input terminals from the three output terminals in a case where the state of the internal switch is the third non-conductive state.

Therefore, the three-phase alternating-current power supply switching circuit can output the fourth phase received by a second input terminal from the three output terminals in a case where a three-phase alternating-current power supply that supplies the fourth phase is used.

In a case where the three-phase alternating-current power supply switching circuit does not receive at least one of the first phase and the fourth phase, the internal switch is set to a third conductive state and the second contactor electrically disconnects the second input terminal from the three output terminals.

The first operation circuit is set to the first conductive state in a case where the three-phase alternating-current power supply switching circuit receives the second phase and the state of the internal switch is the third conductive state. The first contactor electrically and respectively connects the three first input terminals to the three output terminals in a case where the state of the first operation circuit is the first conductive state.

Therefore, in a situation N described below, the three-phase alternating-current power supply switching circuit can output the first phase, the second phase, and the third phase respectively received by the three input terminals from the three output terminals, respectively.

The situation N is a situation in which the three-phase alternating-current power supply switching circuit does not receive at least one of the first phase and the fourth phase, the three-phase alternating-current power supply switching circuit receives the second phase, and the state of the internal switch is the third conductive state.

In other words, the three-phase alternating-current power supply switching circuit can respectively output the first phase, the second phase, and the third phase from the three output terminals in a case where the three-phase alternating-current power supply that does not supply the fourth phase is used.

As mentioned above, the three-phase alternating-current power supply switching circuit has the configuration compatible with the plurality of kinds of three-phase alternating-current power supplies.

The three-phase alternating-current power supply switching circuit having the above-mentioned configuration uses the state of the internal switch included in the second contactor to control the state of the first operation circuit that controls the first contactor. In other words, the three-phase alternating-current power supply switching circuit effectively uses the internal switch included in the second contactor to control the state of the first operation circuit. Therefore, the complex configuration compatible with the plurality of kinds of three-phase alternating-current power supplies can be restrained.

As described above, the three-phase alternating-current power supply switching circuit that restrains the configuration compatible with the plurality of kinds of three-phase alternating-current power supplies from being complex can be provided.

These and other objects, features, aspects and advantages of the present invention will become more apparent from the following detailed description of the present invention when taken in conjunction with the accompanying drawings.

BRIEF DESCRIPTION THE DRAWINGS

DESCRIPTION OF THE PREFERRED EMBODIMENTS

Figure 1:
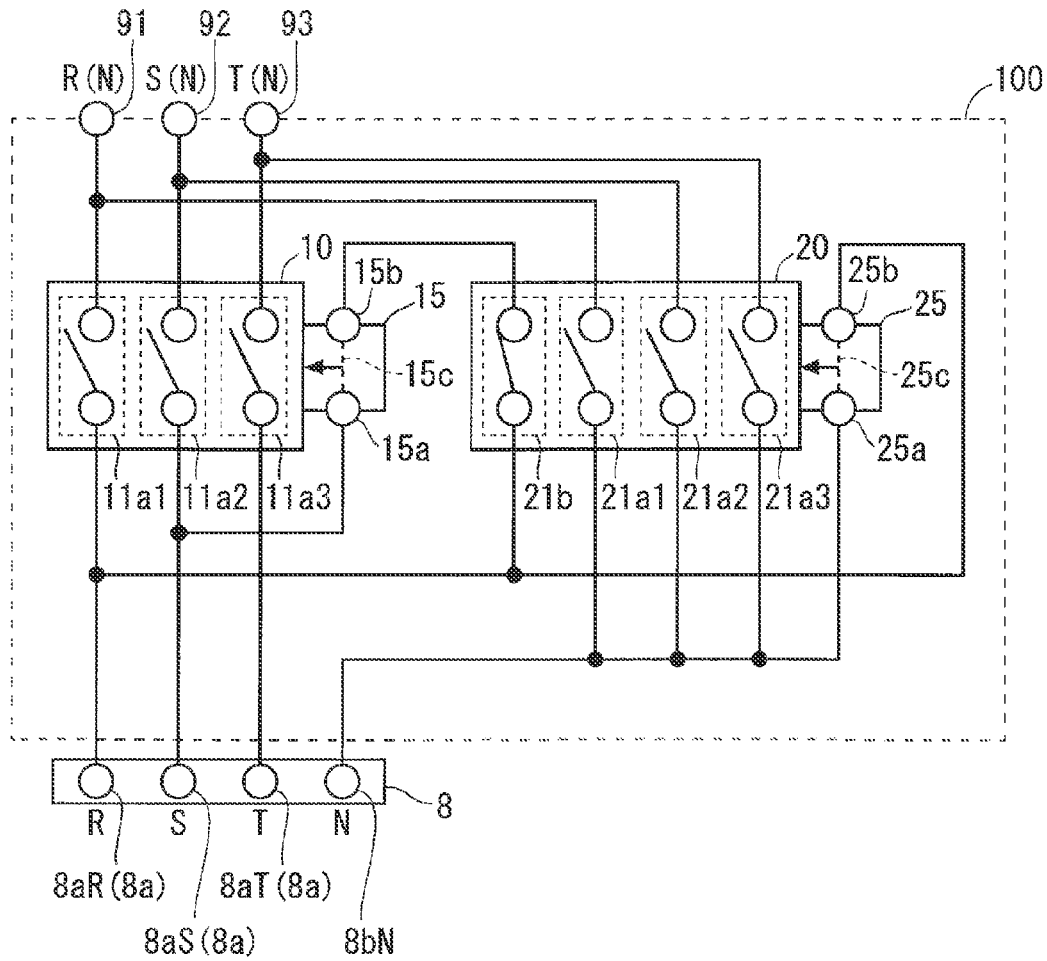
FIG. 1 is diagram illustrating a configuration of a three-phase alternating-current power supply switching circuit according to a first preferred embodiment of the present invention.

A preferred embodiment of the present invention will be described below with reference to the drawings. In the following description, the same components have the same reference numerals. Their names and functions are also the same. Accordingly, their detailed description will be omitted in some cases.

First Preferred Embodiment

FIG. 1 is diagram illustrating a configuration of a three-phase alternating-current power supply switching circuit 100 according to a first preferred embodiment of the present invention. With reference to FIG. 1, the three-phase alternating-current power supply switching circuit 100 is electrically connected to an input terminal part 8. Hereinafter, "electrically" may be omitted from "a structural component A is electrically connected to a structural component B" to express "a structural component A is connected to a structural component B."

The input terminal part 8 is connected to a three-phase alternating-current power supply (not shown). The three-phase alternating-current power supply supplies an R phase, an S phase, and a T phase that form the three-phase alternating current. Each of the R phase, the S phase, and the T phase is the alternating current. In a case where a kind of three-phase alternating-current power supply is a three-phase four-wire system, the three-phase alternating-current power supply further supplies an N phase that is the alternating current. Hereinafter, the R phase, the S phase, the T phase, and the N phase are also denoted by R, S, T, and N, respectively.

The input terminal part 8 includes an input terminal 8aR, an input terminal 8aS, an input terminal 8aT, and an input terminal 8bN. In other words, the three-phase alternating-current power supply switching circuit 100 is connected to the input terminal 8aR, the input terminal 8aS, the input terminal 8aT, and the input terminal 8bN.

The input terminal 8aR, the input terminal 8aS, and the input terminal 8aT are terminals for receiving the R phase, the S phase, and the T phase, respectively. Hereinafter, each of the input terminal 8aR, the input terminal 8aS, and the input terminal 8aT is also referred to as an input terminal 8a.

The input terminal 8bN is a terminal for receiving the N phase. In addition, the input terminal 8bN is a terminal for connecting a neutral wire.

The three-phase alternating-current power supply switching circuit 100 includes a contactor 10, a contactor 20, an operation circuit 15, an operation circuit 25, an output terminal 91, an output terminal 92, and an output terminal 93. The output terminal 91, the output terminal 92, and the output terminal 93 respectively correspond to the input terminal 8aR, the input terminal 8aS, and the input terminal 8aT.

Each of the contactor 10 and the contactor 20 is an alternating-current-operated electromagnetic contactor. The electromagnetic contactor operates through the use of a magnetic force of an electromagnet. The operation circuit 15 is a circuit for controlling the contactor 10. The operation circuit 25 is a circuit for controlling the contactor 20.

The operation circuit 25 includes a terminal 25a, a terminal 25b, and a coil 25c. The coil 25c connects the terminal 25a and the terminal 25b. The terminal 25a is connected to the input terminal 8bN. The terminal 25b is connected to the input terminal 8aR.

The operation circuit 25 is set to any of a conductive state and a non-conductive state. Specifically, the operation circuit 25 is set to the conductive state in a case where the terminal 25b receives the R phase and the terminal 25a receives the N phase. In other words, the operation circuit 25 is set to the conductive state in a case where the three-phase alternating-current power supply switching circuit 100 receives the R phase and the N phase. Moreover, the operation circuit 25 is set to the non-conductive state in a case where the three-phase alternating-current power supply switching circuit 100 does not receive at least one of the R phase and the N phase.

The contactor 20 includes an internal switch 21a1, an internal switch 21a2, an internal switch 21a3, and an internal switch 21b. Each of the internal switch 21a1, the internal switch 21a2, and the internal switch 21a3 is set to any of the conductive state and the non-conductive state according to the state of the operation circuit 25.

Each of the internal switch 21a1, the internal switch 21a2, and the internal switch 21a3 at one end is connected to the input terminal 8bN. The internal switch 21a1, the internal switch 21a2, and the internal switch 21a3 at the other ends are connected to the output terminal 91, the output terminal 92, and the output terminal 93, respectively.

Each of the internal switch 21a1, the internal switch 21a2, and the internal switch 21a3 is set to the non-conductive state at normal times in which the state of the operation circuit 25 is the non-conductive state. Each of the internal switch 21a1, the internal switch 21a2, and the internal switch 21a3 is set to the conductive state in a case where the state of the operation circuit 25 is the conductive state. In other words, each of the internal switch 21a1, the internal switch 21a2, and the internal switch 21a3 functions as an a contact.

In a case where each of the internal switch 21a1, the internal switch 21a2, and the internal switch 21a3 is in the conductive state, the input terminal 8bN is connected to the output terminal 91, the output terminal 92, and the output terminal 93. Hereinafter, each of the internal switch 21a1, the internal switch 21a2, and the internal switch 21a3 is also simply referred to as an internal switch 21a.

The operation of each of the internal switches 21a sets the contactor 20 to any of the conductive state and the non-conductive state according to the state of the operation circuit 25. Specifically, the contactor 20 electrically disconnects the input terminal 8bN from the output terminal 91, the output terminal 92, and the output terminal 93 by the operation of each of the internal switches 21a in a case where the state of the operation circuit 25 is the non-conductive state. The contactor 20 electrically connects the input terminal 8bN to the output terminal 91, the output terminal 92, and the output terminal 93 by the operation of each of the internal switches 21a in a case where the state of the operation circuit 25 is the conductive state.

The internal switch 21b at one end is connected to the input terminal 8aR. The internal switch 21b at the other end is connected to the operation circuit 15, which will be described in detail later.

The internal switch 21b is set to any of the conductive state and the non-conductive state according to the state of the operation circuit 25. Specifically, the internal switch 21b is set to the conductive state in a case where the state of the operation circuit 25 is the non-conductive state. The internal switch 21b is set to the non-conductive state in a case where the state of the operation circuit 25 is the conductive state. In other words, the internal switch 21b functions as a b contact.

The operation circuit 15 includes a terminal 15a, a terminal 15b, and a coil 15c. The coil 15c connects the terminal 15a and the terminal 15b. The operation circuit 15 at one end is connected to the input terminal 8aS. The operation circuit 15 at the other end is connected to the internal switch 21b at the other end. Specifically, the terminal 15a is connected to the input terminal 8aS. The terminal 15b is connected to the internal switch 21 at the other end.

Moreover, the operation circuit 15 is set to any of the conductive state and the non-conductive state. Specifically, the operation circuit 15 is set to the conductive state in a case where the terminal 15a receives the S phase and the terminal 15b receives the R phase. In other words, the operation circuit 15 is set to the conductive state in a case where the three-phase alternating-current power supply switching circuit receives the S phase and the state of the internal switch 21b is the conductive state. In addition, the operation circuit 15 is set to the non-conductive state in a case where the state of the internal switch 21b is the non-conductive state.

The contactor 10 includes an internal switch 11a1 an internal switch 11a2, and an internal switch 11a3. Each of the internal switch 11a1, the internal switch 11a2, and the internal switch 11a3 is set to any of the conductive state and the non-conductive state according to the state of the operation circuit 15.

The internal switch 11a1, the internal switch 11a2, and the internal switch 11a3 at one ends are connected to the input terminal 8aR, the input terminal 8aS, and the input terminal 8aT, respectively. The internal switch 11a1, the internal switch 11a2, and the internal switch 11a3 at the other ends are connected to the output terminal 91, the output terminal 92, and the output terminal 93, respectively.

Each of the internal switch 11a1, the internal switch 11a2, and the internal switch 11a3 is set to the non-conductive state at normal times in which the state of the operation circuit 15 is the non-conductive state. Each of the internal switch 11a1, the internal switch 11a2, and the internal switch 11a3 is set to the conductive state in a case where the state of the operation circuit 15 is the conductive state. In other words, each of the internal switch 11a1, the internal switch 11a2, and the internal switch 11a3 functions as an a contact.

In a case where each of the internal switch 11a1, the internal switch 11a2, and the internal switch 11a3 is in the conductive state, the input terminal 8aR, the input terminal 8aS, and the input terminal 8aT are connected to the output terminal 91, the output terminal 92, and the output terminal 93, respectively. Hereinafter, each of the internal switch 11a1, the internal switch 11a2, and the internal switch 11a3 is also simply referred to as an internal switch 11a.

The operation of each of the internal switches 11a sets the contactor 10 to any of the conductive state and the non-conductive state according to the state of the operation circuit 15. Specifically, the contactor 10 electrically disconnects the input terminal 8aR, the input terminal 8aS, and the input terminal 8aT from the output terminal 91, the output terminal 92, and the output terminal 93 by the operation of each of the internal switches 11a in a case where the state of the operation circuit 15 is the non-conductive state. The contactor 10 electrically and respectively connects the input terminal 8aR, the input terminal 8aS, and the input terminal 8aT to the output terminal 91, the output terminal 92, and the output terminal 93 in a case where the state of the operation circuit 15 is the conductive state.

The three-phase alternating-current power supply switching circuit 100 having the above-mentioned configuration uses the state of the internal switch 21b included in the contactor 20 to control the state of the operation circuit 15 that controls the contactor 10.

Hereinafter, the contactor 10 and the contactor 20 are also referred to as a contactor A and a contactor B, respectively. Hereinafter, the operation circuit 25 is also referred to as an operation circuit B. Hereinafter, the three-phase alternating-current power supply of the three-phase three-wire system is also referred to as a three-phase alternating-current power supply 3P. Hereinafter, the three-phase alternating-current power supply of the three-phase four-wire system is also referred to as a three-phase alternating-current power supply 4P.

The three-phase alternating-current power supply 3P supplies the R phase, the S phase, and the T phase to the input terminal 8aR, the input terminal 8aS, and the input terminal

8aT, respectively. The three-phase alternating-current power supply 4P supplies the R phase, the S phase, the T phase, and the N phase to the input terminal 8aR, the input terminal 8aS, the input terminal 8aT, and the input terminal 8bN, respectively.

Figure 2:
FIG. 2 is a logic diagram illustrating an operation state of the three-phase alternating-current power supply switching circuit according to the first preferred embodiment of the present invention.

Next, an operation of the three-phase alternating-current power supply switching circuit 100 will be described with reference to a logic diagram T10 in FIG. 2. In FIG. 2, a "neutral wire" represents presence or absence of the neutral wire for connecting the input terminal 8bN of the input terminal part 8. "ON" and "CLOSE" represent a "conductive state." "OFF" and "OPEN" represent a "non-conductive state."

First, a configuration in which the three-phase alternating-current power supply 4P is connected to the input terminal part 8 (hereinafter referred to as a configuration A) will be described. Specifically, an operation of the three-phase alternating-current power supply switching circuit 100 (hereinafter referred to as an operation A) in the configuration A will be described. In the configuration A, the neutral wire connects the three-phase alternating-current power supply 4P to the input terminal 8bN of the input terminal part 8.

In the operation A, the terminal 25b receives the R phase and the terminal 25a receives the N phase, to thereby set the operation circuit 25 to the conductive state. Thus, a current flows between the terminal 25a and the terminal 25b. As a result, each of the internal switch 21a1, the internal switch 21a2, and the internal switch 21a3 is set to the conductive state in the contactor 20 (contactor B). Consequently, the N phase is output from the output terminal 91, the output terminal 92, and the output terminal 93 through the internal switch 21a1, the internal switch 21a2, and the internal switch 21a3.

Moreover, in a case where the state of the operation circuit 25 is the conductive state, the internal switch 21b serving as the b contact is set to the non-conductive state. Thus, a current does not flow between the terminal 15a and the terminal 15b. In other words, the state of the operation circuit 15 is the non-conductive state. Consequently, each of the internal switch 11a1, the internal switch 11a2, and the internal switch 11a3 of the contactor 10 (contactor A) is in the non-conductive state. In other words, the output terminal 91, the output terminal 92, and the output terminal 93 of the three-phase alternating-current power supply switching circuit 100 output the N phase in the operation A.

Next, a configuration in which the three-phase alternating-current power supply 3P is connected to the input terminal part 8 (hereinafter referred to as a configuration B) will be described. Specifically, an operation of the three-phase alternating-current power supply switching circuit 100 (hereinafter referred to as an operation B) in the configuration B will be described. In the configuration B, the neutral wire is not connected to the input terminal 8bN.

In the operation B, the state of the operation circuit 25 is the non-conductive state. In this case, a current does not flow between the terminal 25a and the terminal 25b. In a case where the state of the operation circuit 25 is the non-conductive state, the state of each of the internal switch 21a1, the internal switch 21a2, and the internal switch 21a3 of the contactor 20 (contactor B) is the non-conductive state.

Moreover, in a case where the state of the operation circuit 25 is the non-conductive state, the internal switch 21b serving as the b contact is set to the conductive state. Thus, the terminal 15b receives the R phase that has been received by the input terminal 8aR through the internal switch 21b. The terminal 15a receives the S phase that has been received by the input terminal 8aS. As a result, a current flows between the terminal 15a and the terminal 15b. In other words, the state of the operation circuit 15 is set to the conductive state.

In a case where the state of the operation circuit 15 is the conductive state, each of the internal switch 11a1, the internal switch 11a2, and the internal switch 11a3 of the contactor 10 (contactor A) is set to the conductive state. As described above, in the operation B, the output terminal 91, the output terminal 92, and the output terminal 93 of the three-phase alternating-current power supply switching circuit 100 output the R phase, the S phase, and the T phase, respectively.

As described above, in the preferred embodiment, the operation circuit 25 is set to the conductive state in a case where the three-phase alternating-current power supply switching circuit 100 receives the R phase and the N phase. The internal switch 21b is set to the non-conductive state in a case where the state of the operation circuit 25 is the conductive state. The contactor 20 electrically connects the input terminal 8bN to the output terminal 91, the output terminal 92, and the output terminal 93 in a case where the state of the operation circuit 25 is the conductive state.

The contactor 10 electrically disconnects the input terminal 8aR, the input terminal 8aS, and the input terminal 8aT from the output terminal 91, the output terminal 92, and the output terminal 93 in a case where the state of the internal switch 21b is the non-conductive state.

Therefore, the three-phase alternating-current power supply switching circuit 100 can output the N phase received by the input terminal 8bN from the output terminal 91, the output terminal 92, and the output terminal 93 in a case where the three-phase alternating-current power supply that supplies the N phase is used.

In a case where the three-phase alternating-current power supply switching circuit 100 does not receive at least one of the R phase and the N phase, the internal switch 21b is set to the conductive state and the contactor 20 electrically disconnects the input terminal 8bN from the output terminal 91, the output terminal 92, and the output terminal 93.

The operation circuit 15 is set to the conductive state in a case where the three-phase alternating-current power supply switching circuit 100 receives the S phase and the state of the internal switch 21b is the conductive state. The contactor 10 electrically and respectively connects the input terminal 8aR, the input terminal 8aS, and the input terminal 8aT to the output terminal 91, the output terminal 92, and the output terminal 93 in a case where the state of the operation circuit 15 is the conductive state.

Therefore, in a situation N described below, the three-phase alternating-current power supply switching circuit 100 can output the R phase, the S phase, and the T phase respectively received by the input terminal 8aR, the input terminal 8aS, and the input terminal 8aT from the output terminal 91, the output terminal 92, and the output terminal 93, respectively.

The situation N is a situation in which the three-phase alternating-current power supply switching circuit 100 does not receive at least one of the R phase and the N phase, the three-phase alternating-current power supply switching circuit 100 receives the S phase, and the state of the internal switch 21b is the conductive state.

In other words, the three-phase alternating-current power supply switching circuit 100 can respectively output the R phase, the S phase, and the T phase from the output terminal 91, the output terminal 92, and the output terminal 93 in a case where the three-phase alternating-current power supply that does not supply the N phase is used.

As mentioned above, the three-phase alternating-current power supply switching circuit 100 has the configuration compatible with the plurality of kinds of three-phase alternating-current power supplies.

The three-phase alternating-current power supply switching circuit 100 having the above-mentioned configuration uses the state of the internal switch 21*b* included in the contactor 20 to control the state of the operation circuit 15 that controls the contactor 10. In other words, the three-phase alternating-current power supply switching circuit 100 effectively uses the internal switch 21*b* included in the contactor 20 to control the state of the operation circuit 15. Therefore, the complex configuration compatible with the plurality of kinds of three-phase alternating-current power supplies can be restrained.

As described above, the three-phase alternating-current power supply switching circuit 100 that restrains the configuration compatible with the plurality of kinds of three-phase alternating-current power supplies from being complex can be provided.

Furthermore, the three-phase alternating-current power supply switching circuit 100 is used in the system including the plurality of kinds of three-phase alternating-current power supplies, whereby the three-phase alternating-current power supply 3P of a 200 V system and the three-phase alternating-current power supply 4P of a 400 V system, for example, can be switched according to presence or absence of the neutral wire. The three-phase alternating-current power supply 3P of the 200 V system is a power supply mainly used in North America. The three-phase alternating-current power supply 4P of the 400 V system is a power supply mainly used in Europe.

This preferred embodiment automatically switches the output states of the output terminal 91, the output terminal 92, and the output terminal 93 based on whether or not the three-phase alternating-current power supply switching circuit 100 receives the N phase. Thus, upon the switching, a means of detecting a phase-to-phase voltage of the three-phase alternating-current power supply is not necessary. In the preferred embodiment, the configuration of the switching can be applied to the input terminal part of the alternating-current power supply.

For example, in a case where the three-phase alternating-current power supply is the three-phase alternating-current power supply 4P, the three-phase alternating-current power supply switching circuit 100 connects the three-phase alternating-current power supply to a power supply unit (not shown) downstream of the three-phase alternating-current power supply switching circuit 100 in a star connection. In a case where the three-phase alternating-current power supply is the three-phase alternating-current power supply 3P, the three-phase alternating-current power supply switching circuit 100 connects the three-phase alternating-current power supply to a power supply unit (not shown) downstream of the three-phase alternating-current power supply switching circuit 100 in a delta connection. Therefore, the power supply system including the three-phase alternating-current power supply switching circuit 100 compatible with a wide range of the input voltages can be constructed at low cost.

In the above-mentioned related technology A, the thyristor is used as the switching means as described above. Thus, the related technology A requires the drive circuit for switching the thyristor, the timing control circuit, and the circuit for determining whether or not to control the switching. Therefore, the related technology A has the complex configuration compatible with the plurality of kinds of three-phase alternating-current power supplies.

Furthermore, the related technology A has the configuration in which the switching means is applied to the power conversion part. In the configuration in which the existing power supply system including the power conversion part is incorporated into the downstream of the configuration of the related technology A, for example, the power conversion parts thus overlap. As a result, efficiency is reduced, requiring a review of protection components such as a fuse. Consequently, it is difficult to incorporate the existing power supply system as it is into the downstream of the configuration of the related technology A for parallel operation. Therefore, the related technology A has problems that a specific design is required, causing an increase in costs and a period of development in the development of the system.

On the other hand, the preferred embodiment has the configuration as described above, so that the preferred embodiment can solve the problems of the related technology A.

Second Preferred Embodiment

Figure 3:
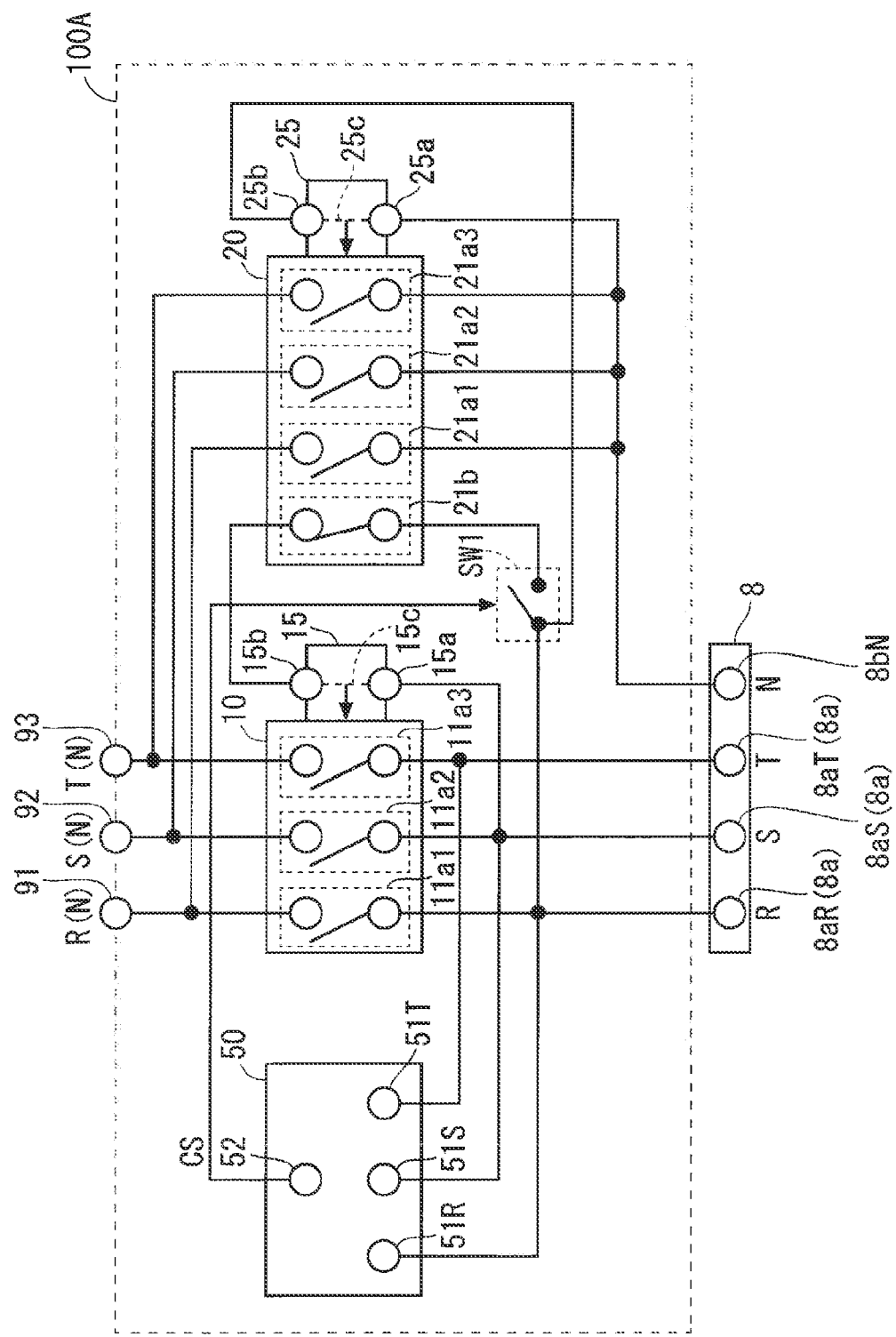
FIG. 3 is a diagram illustrating a configuration of a three-phase alternating-current power supply switching circuit according to a second preferred embodiment of the present invention.

In this preferred embodiment, a configuration including a phase-to-phase voltage among an R phase, an S phase, and a T phase will be described. FIG. 3 is a diagram illustrating a configuration of a three-phase alternating-current power supply switching circuit 100A according to a second preferred embodiment of the present invention.

With reference to FIG. 3, the three-phase alternating-current power supply switching circuit 100A is different from the three-phase alternating-current power supply switching circuit 100 in that the three-phase alternating-current power supply switching circuit 100A further includes a phase-to-phase voltage detection circuit 50 and a switch SW1. The configuration of the three-phase alternating-current power supply switching circuit 100A except for that above is the same as the configuration of the three-phase alternating-current power supply switching circuit 100, so that detailed descriptions will not be repeated.

The phase-to-phase voltage detection circuit 50 is a circuit for detecting (searching) a phase-to-phase voltage of two different alternating currents among the R phase, the S phase, and the T phase that are the alternating currents. The phase-to-phase voltage is, for example, a phase-to-phase voltage between the R phase and the S phase. Moreover, the phase-to-phase voltage is, for example, a phase-to-phase voltage between the S phase and the T phase.

The phase-to-phase voltage detection circuit 50 includes a terminal 51R, a terminal 51S, a terminal 51T, and a terminal 52. The terminal 51R, the terminal 51S, and the terminal 51T are connected to the input terminal 8*a*R, the input terminal 8*a*S, and the input terminal 8*a*T, respectively. The terminal 52 is connected to the switch SW1. The phase-to-phase detection circuit 50 transmits a control signal CS from the terminal 52 to the switch SW1 based on whether or not the phase-to-phase voltage is within the range of rated voltages. The control signal CS controls the switch SW1.

Hereinafter, the range of the rated voltages is also referred to as a rated voltage range. The rated voltage range is a value of the range in which an allowable error is added to or subtracted from the rated voltage. The allowable error is, for example, 1% of the rated voltage. As an example, in a case where the rated voltage is 200 V, the rated voltage range is from 198 to 202 V.

The phase-to-phase detection circuit 50 transmits the control signal CS at an H level to the switch SW1 in a case where each phase-to-phase voltage is within the rated voltage range.

The phase-to-phase detection circuit 50 transmits the control signal CS at an L level to the switch SW1 in a case where at least one phase-to-phase voltage of each phase-to-phase voltage is not within the rated voltage range. When the control signal CS at the L level is transmitted to the switch SW1, it is a situation A described below.

In the situation A, for example, a phase-to-phase voltage, which is greater than the maximum value in the rated voltage range, is a so-called overvoltage or a phase-to-phase voltage, which is smaller than the minimum value in the rated voltage range, is a so-called low voltage.

The switch SW1 is set to any of the conductive state and the non-conductive state based on the phase-to-phase voltage detected by the phase-to-phase voltage detection circuit 50. Specifically, the switch SW1 is set to the conductive state in a case where the switch SW1 receives the control signal CS at the H level. The switch SW1 is set to the non-conductive state in a case where the switch SW1 receives the control signal CS at the L level.

The switch SW1 is provided between the input terminal 8aR and the internal switch 21b at one end.

In a case where the state of the switch SW1 is the conductive state, the input terminal 8aR is electrically connected to the internal switch 21b at the one end, the internal switch 21b serving as the b contact. In a case where the state of the switch SW1 is the non-conductive state, the input terminal 8aR is electrically disconnected from the internal switch 21b at the one end.

Figures 4, 5:
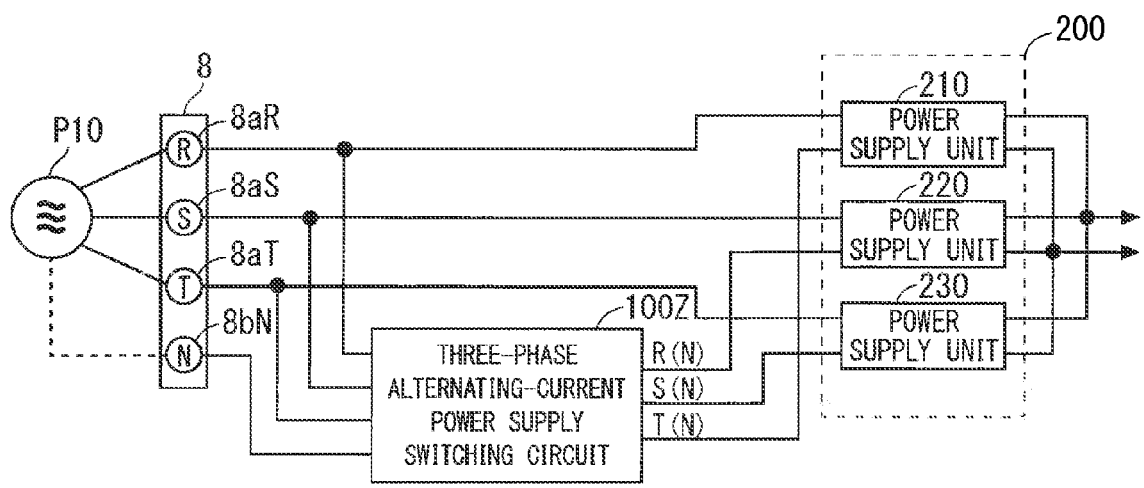
FIG. 4 is a logic diagram illustrating an operation state of the three-phase alternating-current power supply switching circuit according to the second preferred embodiment of the present invention.
FIG. 5 is a diagram illustrating an exemplary configuration of a power supply system including a three-phase alternating-current power supply switching circuit.

Next, with reference to a logic diagram T20 in FIG. 4, an operation of the three-phase alternating-current power supply switching circuit 100A will be described. The same items shown in the logic diagram T20 as those in FIG. 2 are described above, so that detailed descriptions will not be repeated. In FIG. 4, a "P-P voltage" is a voltage detected by the phase-to-phase voltage detection circuit 50.

First, a configuration in which the three-phase alternating-current power supply 4P is connected to the input terminal part 8 (hereinafter referred to as a configuration A1) will be described. Specifically, the operation of the three-phase alternating-current power supply switching circuit 100A in the configuration A1 (hereinafter referred to as an operation A1) will be described. In the configuration A1, the neutral wire connects the three-phase alternating-current power supply 4P and the input terminal 8bN of the input terminal part 8.

In the operation A1 similarly to the operation A described above, the terminal 25b receives the R phase and the terminal 25a receives the N phase, to thereby set the operation circuit 25 to the conductive state. In the contactor 20 (contactor B), each of the internal switch 21a1, the internal switch 21a2, and the internal switch 21a3 is set to the conductive state. Moreover, in a case where the state of the operation circuit 25 is the conductive state, the internal switch 21b serving as the b contact is set to the non-conductive state.

In this case, the operation A1 is the same operation as the above-mentioned operation A regardless of the state of the switch SW1. In other words, in the operation A1, the output terminal 91, the output terminal 92, and the output terminal 93 of the three-phase alternating-current power supply switching circuit 100A output the N phase.

Next, a configuration in which the three-phase alternating-current power supply 3P is connected to the input terminal part 8 (hereinafter referred to as a configuration B1) will be described. Specifically, an operation of the three-phase alternating-current power supply switching circuit 100A in the configuration B1 (hereinafter referred to as an operation B1) will be described. In the configuration B1, the neutral wire is not connected to the input terminal 8bN.

In the operation B1, the state of the operation circuit 25 is the non-conductive state. Therefore, the internal switch 21b serving as the b contact is set to the conductive state. In this case, the alternating currents output from the output terminal 91, the output terminal 92, and the output terminal 93 of the three-phase alternating-current power supply switching circuit 100 are changed according to the state of the switch SW1.

The switch SW1 is set to the conductive state in a case where the phase-to-phase voltage is within the rated voltage range. Specifically, the phase-to-phase voltage detection circuit 50 transmits the control signal CS at the H level to the switch SW1 in a case where each phase-to-phase voltage is within the rated voltage range. In this case, the switch SW1 is set to the conductive state.

The switch SW1 electrically connects the input terminal 8aR receiving the R phase to the internal switch 21b in a case where the state of the switch SW1 is the conductive state. Therefore, the operation B1 performs the same process as that of the above-mentioned operation B. In other words, the output terminal 91, the output terminal 92, and the output terminal 93 of the three-phase alternating-current power supply switching circuit 100 output the R phase, the S phase, and the T phase, respectively.

On the other hand, the switch SW1 is set to the non-conductive state in a case where the phase-to-phase voltage is outside the rated voltage range. Specifically, the phase-to-phase voltage detection circuit 50 transmits the control signal CS at the L level to the switch SW1 in a case where at least one phase-to-phase voltage of each phase-to-phase voltage is not within the rated voltage range. When the phase-to-phase voltage is not within the rated voltage range, it is the situation A described above.

In this case, the switch SW1 is set to the non-conductive state. The switch SW1 electrically disconnects the input terminal 8aR receiving the R phase from the internal switch 21b in a case where the state of the switch SW1 is the non-conductive state. Thus, a current does not flow between the terminal 15a and the terminal 15b. In other words, the state of the operation circuit 15 is the non-conductive state.

In this case, each of the internal switch 11a1, the internal switch 11a2, and the internal switch 11a3 of the contactor 10 (contactor A) remains in the non-conductive state. In the configuration B1, the neutral wire is not connected to the input terminal 8bN. Thus, in the contactor 20 (contactor B), each of the internal switch 21a1, the internal switch 21a2, and the internal switch 21a3 remains in the non-conductive state.

As described above, the output terminal 91, the output terminal 92, and the output terminal 93 of the three-phase alternating-current power supply switching circuit 100A do not output the alternating currents.

For example, in the configuration including the three-phase alternating-current power supply 4P of the 400 V system, a current is assumed to be continuously passed in a situation where the neutral wire is forgotten to be connected to the input terminal 8bN or the neutral wire is broken.

In this case, the state of the switch SW1 is controlled based on the phase-to-phase voltage as in the operation B1. Thus, the output terminal 91, the output terminal 92, and the output terminal 93 of the three-phase alternating-current power supply switching circuit 100A do not output the alternating currents in a case where a voltage outside the normal voltage range is applied to the three-phase alternating-current power supply switching circuit 100A. The normal voltage range is, for example, the rated voltage range of the 200 V system.

In other words, even in a case where the neutral wire is forgotten to be connected or the neutral wire is broken, the circuit (for example, load circuit) downstream of the three-phase alternating-current power supply switching circuit 100A can be prevented from operating at the overvoltage or the low voltage (insufficient voltage). In other words, the circuit downstream of the three-phase alternating-current power supply switching circuit 100A can be prevented from being adversely affected.

As described above, in the preferred embodiment, the output terminal 91, the output terminal 92, and the output terminal 93 do not output the alternating currents in a case where the phase-to-phase voltage is outside the rated voltage range. Thus, if the phase-to-phase voltage is outside the rated voltage range, the circuit downstream of the three-phase alternating-current power supply switching circuit 100A can be prevented from being adversely affected.

(System Configuration)

FIG. 5 is a diagram illustrating an exemplary configuration of a power supply system 1000 including a three-phase alternating-current power supply switching circuit 100Z. The three-phase alternating-current power supply switching circuit 100Z is the three-phase alternating-current power supply switching circuit 100 of the first preferred embodiment or the three-phase alternating-current power supply switching circuit 100A of the second preferred embodiment.

With reference to FIG. 5, the power supply system 1000 includes a three-phase alternating-current power supply P10, the input terminal part 8 described above, the three-phase alternating-current power supply switching circuit 100Z, and a power supply part 200.

The three-phase alternating-current power supply P10 is the three-phase alternating-current power supply 3P described above or the three-phase power supply 4P described above.

The connection relationship between the input terminal part 8 and the three-phase alternating-current power supply switching circuit 100Z is the same as that of the first preferred embodiment, so that detailed descriptions will not be repeated.

The power supply part 200 has a function of supplying power to the circuit downstream of the power supply part 200. The power supply part 200 includes a power supply unit 210, a power supply unit 220, and a power supply unit 230.

The power supply unit 210 is connected to the input terminal 8aR and the output terminal 93. The power supply unit 220 is connected to the input terminal 8aS and the output terminal 91. The power supply unit 230 is connected to the input terminal 8aT and the output terminal 92.

Next, an operation of the power supply system 1000 will be described. The three-phase alternating-current power supply switching circuit 100Z of the power supply system 1000 operates similarly to the operations of the first preferred embodiment or the second preferred embodiment.

In other words, in a case where the three-phase alternating-current power supply P10 is the three-phase alternating-current power supply 4P, the three-phase alternating-current power supply switching circuit 100Z connects the three-phase alternating-current power supply P10 to the power supply unit 210, the power supply unit 220, and the power supply unit 230 in a star connection. In a case where the three-phase alternating-current power supply P10 is the three-phase alternating-current power supply 3P, the three-phase alternating-current power supply switching circuit 100Z connects the three-phase alternating-current power supply P10 to the power supply unit 210, the power supply unit 220, and the power supply unit 230 in a delta connection.

In other words, the three-phase alternating-current power switching circuit 100Z detects that the three-phase alternating-current power supply P10 is any of the three-phase alternating-current power supply 3P and the three-phase alternating-current power supply 4P based on whether or not the input terminal 8bN receives the N phase from the three-phase alternating-current power supply P10. Then, the three-phase alternating-current power supply switching circuit 100Z can automatically switch the output states of the output terminal 91, the output terminal 92, and the output terminal 93 based on the detection result. Thus, the power supply system 1000 can be compatible with a wide range of the input voltages.

Specifically, in the power supply system 1000, the three-phase alternating-current power supply switching circuit 100Z can be compatible with the plurality of kinds of three-phase alternating-current power supplies by performing the operation A or the operation B of the first preferred embodiment.

In the power supply system 1000, the three-phase alternating-current power supply switching circuit 100Z is assumed to perform the operation A1 or the operation B1 of the second preferred embodiment. In this case, even if the phase-to-phase voltage is outside the rated voltage range, for example, the power supply unit 210, the power supply unit 220, and the power supply unit 230 can prevent the three-phase alternating-current power supply switching circuit 100Z from operating at the overvoltage or the low voltage.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A three-phase alternating-current power supply switching circuit connected to three first input terminals for respectively receiving a first phase, a second phase, and a third phase that form a three-phase alternating current and connected to a second input terminal for receiving a fourth phase being an N phase, said three-phase alternating-current power supply switching circuit comprising:
   three output terminals that respectively correspond to said three first input terminals;
   a first operation circuit that is set to any of a first conductive state and a first non-conductive state;
   a first contactor that is controlled by said first operation circuit;
   a second operation circuit that is set to any of a second conductive state and a second non-conductive state; and
   a second contactor that is controlled by said second operation circuit, wherein
   said second operation circuit is set to:
      (a1) said second conductive state in a case where said three-phase alternating-current power supply switching circuit receives said first phase and said fourth phase, and
      (a2) said second non-conductive state in a case where said three-phase alternating-current power supply switching circuit does not receive at least one of said first phase and said fourth phase,
   said second contactor includes an internal switch,
   said internal switch is set to:
      (a3) a third conductive state in a case where a state of said second operation circuit is said second non-conductive state, and
      (a4) a third non-conductive state in a case where the state of said second operation circuit is said second conductive state,
   said second contactor:

(a5) electrically disconnects said second input terminal from said three output terminals in a case where the state of said second operation circuit is said second non-conductive state, and (a6) electrically connects said second input terminal to said three output terminals in a case where the state of said second operation circuit is said second conductive state, said first operation circuit is set to:

(a7) said first conductive state in a case where said three-phase alternating-current power supply switching circuit receives said second phase and a state of said internal switch is said third conductive state, and (a8) said first non-conductive state in a case where the state of said internal switch is said third non-conductive state, and said first contactor:

(a9) electrically disconnects said three first input terminals from said three output terminals in a case where a state of said first operation circuit is said first non-conductive state, and (a10) electrically and respectively connects said three first input terminals to said three output terminals in a case where the state of said first operation circuit is said first conductive state.

2. The three-phase alternating-current power supply switching circuit according to claim 1, further comprising:

a phase-to-phase voltage detection circuit that detects a phase-to-phase voltage of two different alternating currents among said first phase, said second phase, and said third phase that are the alternating currents; and a switch that is set to any of a fourth conductive state and a fourth non-conductive state based on said phase-to-phase voltage detected, wherein said switch:

(b1) electrically connects said first input terminal receiving said first phase to said internal switch in a case where a state of said switch is said fourth conductive state, and (b2) electrically disconnects said first input terminal receiving said first phase from said internal switch in a case where the state of said switch is said fourth non-conductive state.

3. The three-phase alternating-current power supply switching circuit according to claim 2, wherein said switch is set to:

(c1) said fourth conductive state in a case where said phase-to-phase voltage is within a range of rated voltages, and (c2) said fourth non-conductive state in a case where said phase-to-phase voltage is outside the range of said rated voltages.

* * * * *